United States Patent Office 3,816,468
Patented June 11, 1974

3,816,468
FLUORO-2-HYDROXYTETRAHYDROPYRANS
Samuel Gelfan, Niagara Falls, and Russell L. K. Carr, Grand Island, N.Y., and Charles F. Baranauckas, Edina, Minn., assignors to Hooker Chemical Corporation, Niagara Falls, N.Y.
No Drawing. Continuation of application Ser. No. 867,060, Oct. 16, 1969, which is a continuation-in-part of Ser. No. 669,652, Sept. 21, 1967, which in turn is a continuation-in-part of Ser. No. 178,266, Mar. 8, 1962, all now abandoned. This application Sept. 28, 1971, Ser. No. 184,583
Int. Cl. C07d 7/04
U.S. Cl. 260—345.9     1 Claim

ABSTRACT OF THE DISCLOSURE

New compounds of the formula:

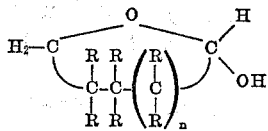

wherein $n$ is from 0 to 1, and wherein the R's are selected from the group consisting of fluorine, perfluoroalkyl, perfluorocycloalkyl and perfluorophenyl, and may be the same or different. Also disclosed is a method for preparation of such compounds, which comprises reacting hydrogen with a precursor diacid halide. The compounds are useful as chemical intermediates and as additives to improve the clarity of plastics, such as polyvinyl chloride films.

---

This is a continuation of application Ser. No. 867,060, filed Oct. 16, 1969, which in turn is a continuation-in-part of Ser. No. 669,652, filed Sept. 21, 1967, which was a continuation-in-part of Ser. No. 178,266, filed Mar. 8, 1962, all said applications now abandoned.

This invention relates to novel fluorinated tetrahydropyrans and novel fluorinated tetrahydrofurans, a process for preparing said compounds, and their uses in improving clarity of plastic films and as chemical intermediates.

The new compositions of matter of the present invention are prepared in good yields without the use of expensive pressure equipment or without the use of expensive chemical reducing agents.

In accordance with the present invention the novel compositions may be illustrated by the following general formula:

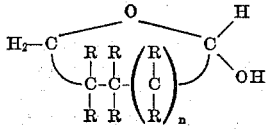

wherein $n$ is 0 or 1, and wherein the R's, which may be the same or different, are selected from the group consisting of fluorine, perfluoroalkyl, perfluorocycloalkyl and perfluorophenyl. Also, in accordance with the present invention, said compounds are prepared by a hydrogenation process and are used to improve the clarity of plastic films.

Among the various R's, the perfluoroalkyl radicals usually contain from about 1 to about 12 carbon atoms, preferably from about 1 to about 6 carbon atoms, while the perfluorocycloalkyl radicals usually contain from about 3 to about 12 carbon atoms, preferably from about 5 to about 7 carbon atoms. The aryl and perfluoroaryl radicals usually contain from about 6 to about 20 carbon atoms, preferably from about 6 to about 10 carbon atoms. The preferred aryl is phenyl.

Typical of the 2-hydroxytetrahydropyrans of the present invention are 2-hydroxy-3,3,4,4,5,5-hexafluorotetrahydropyran,
2-hydroxy-3-trifluoromethyl-3,4,4,5,5-pentafluoro-
  tetrahydropyran,
2-hydroxy-4-trifluoromethyl-3,3,4,5,5-pentafluoro-
  tetrahydropyran,
2-hydroxy-5-trifluoromethyl-3,3,4,4,5-pentafluoro-
  tetrahydropyran,
2-hydroxy-3,3-bis(pentafluoroethyl)-4,4,5,5-tetrafluoro-
  tetrahydropyran,
2-hydroxy-4,4-bis(trifluoromethyl)-3,3,5,5-tetra-
  fluorotetrahydropyran,
2-hydroxy-3-trifluoromethyl-4-pentafluoroethyl-5-hepta-
  fluoroisopropyl-3,4,5-trifluorotetrahydropyran,
2-hydroxy-3,3,4,4,5,5-hexa(trifluoromethyl)-tetra-
  hydropyran,
2-hydroxy-3-pentafluorophenyl-4,4-bis(octafluorocyclo-
  butyl)-3,4,5,5-tetrafluorotetrahyropyran,
2-hydroxy-3-heptadecafluorooctyl-3,4,4,5,5-penta-
  fluorotetrahydropyran,
2-hydroxy-3,5-(bispentafluorophenyl)-3,4,4,5-tetra-
  fluorotetrahydropyran, and
2-hydroxy-4-trifluoromehyl-5-dodecafluorocyclohexyl-
  3,3,4,5-tetrafluorotetrahydropyran.

Typical of the 2-hydroxytetrahydrofurans of the present invention, and convertible to the corresponding 1,4-butane diols are 2-hydroxy-3,3,4,4-tetrafluoro-
  tetrahydrofuran,
2-hydroxy-3-trifluoromethyl-3,4,4-trifluorotetra-
  hydrofuran,
2-hydroxy-4-trifluoromethyl-3,3,4-trifluorotetra-
  hydrofuran,
2-hydroxy-3,3-bis(pentafluoroethyl)-4,4-difluoro-
  tetrahydrofuran,
2-hydroxy-4,4-bis(trifluoromethyl)-3,3-difluoro-
  tetrahydrofuran,
2-hydroxy-3-trifluoromethyl-4-pentafluoroethyl-3,4-
  difluorotetrahydrofuran,
2-hydroxy-3,3,4,4-tetrakis(trifluoromethyl)tetra-
  hydrofuran,
2-hydroxy-3-pentafluorophenyl-4,4-bis(octafluorocyclo-
  butyl)-3-fluorotetrahydrofuran,
2-hydroxy-3-heptadecafluorooctyl-3,4,4-trifluoro-
  tetrahydrofuran,
2-hydroxy-3,4-bis(pentafluorophenyl)-3,4-difluoro-
  tetrahydrofuran, and
2-hydroxy-3-trifluoromethyl-4-dodecafluorocyclohexyl-
  3,4-difluorotetrahydrofuran.

The compounds of this invention may be prepared by the following reaction:

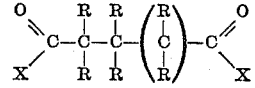

wherein X is selected from the group consisting of chlorine, fluorine, bromine, and mixtures thereof, and wherein $n$ is 0 or 1, and R, which may be the same or different, is selected from the group consisting of fluorine, perfluoroalkyl, perfluorocycloalkyl, and perfluoroaryl, e.g., perfluorophenyl.

A typical process for the preparation of the pyrans of this invention, illustrated with respect to the perfluoro-substituted embodiments, is as follows:

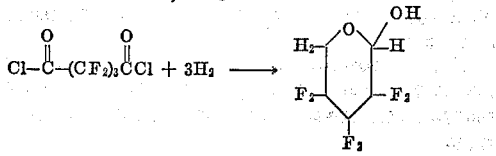

Similarly, a process which is typical for the preparation of the furans of this invention is as follows:

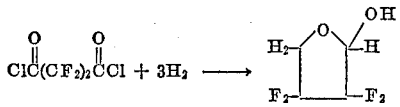

However, with respect to such reactions to produce both the pyrans and furans previously listed, similar reactions are also operative, starting with the corresponding diacyl halides.

Typical starting materials that may be prepared by methods known in the prior art are as follows:

2,2,3,3,4,4-hexafluoroglutaryl chloride,
2-trifluoromethyl-2,3,3,4,4-pentafluoroglutaryl chloride,
3-trifluoromethyl-2,2,3,4,4-pentafluoroglutaryl chloride,
2-trifluoromethyl-2,3,3,4,4-pentafluoroglutaryl bromide,
2,2-bis(pentafluoroethyl)-3,3,4,4-tetrafluoroglutaryl chloride,
3,3-bis(trifluoromethyl)-2,2,4,4-tetrafluoroglutaryl fluoride,
2-trifluoromethyl-3-pentafluoroethyl-4-heptafluoroisopropyl-2,3,4-trifluoroglutaryl bromide,
2,2,3,3,4,4-hexa(trifluoromethyl)glutaryl chloride,
2-pentafluorophenyl-3,3-bis(octafluorocyclobutyl)-2,3,4,4-tetrafluoroglutaryl chloride,
2-heptadecylfluorooctyl-2,3,3,4,4-pentafluoroglutaryl bromide,
2,4-bis(pentafluorophenyl)-2,3,3,4-tetrafluoroglutaryl chloride, and
3-trifluoromethyl-4-dodecylfluorocyclohexyl-2,2,3,4-tetrafluoroglutaryl,
2,2,3,3-tetrafluorosuccinyl chloride,
2-trifluoromethyl-2,3,3-trifluorosuccinyl chloride,
3-trifluoromethyl-2,2,3-trifluorosuccinyl chloride,
2,2-bis(pentafluoroethyl)-3,3-difluorosuccinyl chloride,
3,3-bis(trifluoromethyl)-2,2-difluorosuccinyl chloride,
2-(trifluoromethyl)-3-pentafluoroethyl-2,3-difluorosuccinyl chloride,
2,2,3,3-tetrakis(trifluoromethyl)succinyl fluoride,
2-pentafluorophenyl-3,3-bis(octafluorocyclobutyl)-2-fluorosuccinyl bromide,
2-heptadecafluorooctyl-2,3,3-trifluorosuccinyl chloride,
2,3-bis(pentafluorophenyl)-2,3-difluorosuccinyl chloride, and
2-trifluoromethyl-3-dodecafluorocyclohexyl-2,3-difluorosuccinyl chloride.

These compounds are illustrative starting compounds, but the listing thereof is not intended to be exhaustive.

In processes for the preparation of the furans and the pyrans of this invention, reaction temperatures ranging from about 120° to 350° C. may be employed, although the preferred temperatures are in the range of 130° to 250° C. Furthermore, although catalysts such as palladium on carbon are preferred, materials like palladium, platinum and nickel may be used as catalysts either as such or supported on Kieselguhr, clay, carbon, barium sulfate, silica gel or asbestos. In addition, copper chrome oxide catalysts may be employed. Also a fixed or moving catalyst bed may be used with the reactants passing over or through it or a fluidized bed technique may be employed.

Concerning the ratios of the reactants, hydrogen and diacyl chloride, although mole ratios in the range 2.5:1 to 30:1 are preferred, mole ratios in the range 0.25:1 to 100:1 may also be utilized. It is preferred that these processes be conducted at or near atmospheric pressure, although pressures above and below atmospheric may also be used.

The compositions of this invention are useful as chemical intermediates in the preparations of diols, esters, and halogen derivatives. They also improve clarity of plastic films.

A composition containing the hemiacetal of Example 1 was examined for herbicidal activity in preliminary greenhouse tests. Plots containing seedlings of rye, millet and cucumber were sprayed at the rate of four pounds per acre when the seedlings were 2–3 weeks old. The spray comprised the above described composition in water, which contained about 0.5 volume percent of a mixture of emulsifier, xylene and isophorone. The seedlings were examined about 2 weeks after application; the injury to the plants (or the amount of topkill) indicated phytotoxicity and utility as a herbicide of the compounds of this invention.

The compositions of this invention are useful as chemical intermediates in the preparation of diols, esters and halogen derivatives. Esters of the 2-hydroxytetrahydropyrans and 2-hydroxytetrahydrofurans may be prepared by the following reaction:

(1a)

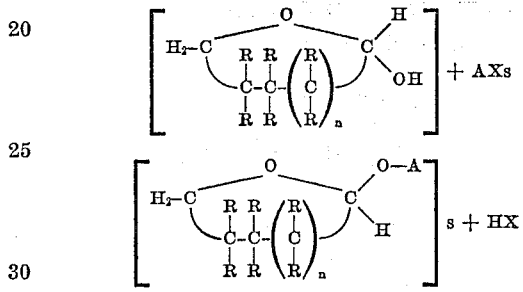

(1b)         sHX+sB yields_____sB·HX

In these equations, $s$ is a number from 1 to 3 inclusive, A is selected from the group consisting of alkylcarbonyl, cycloalkylcarbonyl, arylcarbonyl, alkylsulfonyl, arylsulfonyl, cycloalkylsulfonyl, sulfonyl, sulfinyl, phosphinylidyne, phosphinidyne, alkoxyphosphinidene, dialkoxyphosphino, aryloxyphosphinidene, diaryloxyphosphino, alkylphosphinylidene, and arylphosphinylidene, X is selected from the group consisting of fluorine, chlorine and bromine, and B is selected from the group consisting of pyridine, alkyl substituted pyridine, N,N,-dialkylaniline, trialkylamine, quinoline, isoquinoline, tetraalkyl ammonium hydroxide, ammonium hydroxide and alkali metal hydroxide. In equation (1b) the presence of a base facilitates the isolation of the product by converting it to a salt.

Esters of the formula:

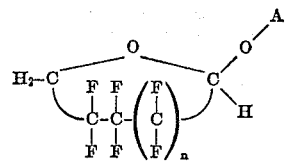

wherein A is selected from the group consisting of alkylcarbonyl, arylcarbonyl, arylsulfonyl and alkylsulfonyl, are phytotoxic. Plots containing seedlings of rye, millet and cucumber were sprayed with the compositions of this invention and phytotoxicity was indicated.

The following examples will illustrate embodiments of this invention. It should be understood however, that these examples are given by way of illustration and are not to be considered as limitations on the scope of the invention. All temperatures are in degrees centigrade and all parts are by weight, unless otherwise indicated.

EXAMPLE 1

The apparatus used comprised a vertical glass tubing reactor ⅞" to 1" in diameter and about 17" long, having an electrically heated section about 12" long and equipped with an addition system such that both hydrogen gas and hexafluoroglutaryl chloride could be added at approximately constant rates. The reactor system was also equipped with a pressure relief valve (for purposes of safety), a thermocouple well and a thermocouple connected to a potentiometer, and a receiver connected to the exit end of the reactor, which was also connected to a trap cooled in a Dry Ice-acetone cooling bath. The heated section of the reactor was filled with a catalyst of 1% palladium-on-carbon.

With the temperature near the center of the reactor at about 160° C., the system was purged with hydrogen for about 18 hours to remove substantially all the water originally present. Hexafluoroglutaryl chloride (823 grams, 2.98 gram moles) and hydrogen gas were introduced into the reactor during a period of about thirteen hours at average flow rates of about 0.23 moles per hour and about 4.1 moles per hour, respectively. The temperature near the center of the reactor during this time was in the range of 160 to 170 C. With organic reagent flow off, hydrogen was passed through for 15 to 30 minutes, and then, until the reactor was cold. A total of 585 g. of product was collected, of which about 90% was distillable below 180° C. at atmospheric pressure, and about 62% boiled in the range 150–160° C. This latter material was shown to be 2-hydroxy-3,3,4,5,5-hexafluorotetrahydropyran,

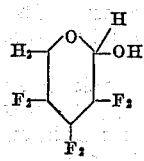

a hygroscopic white solid, melting point of 49–51° C., and boiling point of 154–155.5° C. The structure of this material (called the hydroxypyran or hemiacetal) was established as follows: Analyses—Found: percent C, 27.86, 28.19, average 28.03; percent H, 2.24, 2.10, average 2.17; percent F, 53.1, 53.5, average 53.3. Calculated for $C_5H_4F_6O_2$: percent C, 28.58; percent H, 1.92; percent F, 54.26. Precipitates were obtained upon reaction with semicarbazide hydrochloride after long standing, with 2,4-dinitrophenylhydrazine in 85% $H_3PO_4$, and with saturated aqueous-alcoholic sodium bisulfite; aged material gave a good mirror with ammoniacal silver nitrate, whereas freshly distilled material did not. Reaction with acyl halides produced esters. These reactions and the absence of a carbonyl absorption in the infrared spectrum are consistent with the presence of a hidden or protected aldehyde group, such as that of a hemiacetal.

The p-toluenesulfonate ester (Analysis—Found: percent C, 40.05, 40.22, aver. 40.14; percent H, 2.86, 3.03, aver. 2.95; percent S, 9.32, 9.39, aver. 9.35; percent F, 31.5, 30.4, aver. 30.95; Calculated for $C_{12}H_{10}F_6O_4S$: percent C, 39.6; percent H, 2.7; percent S, 8.8; percent F, 31.3) was converted to the corresponding chloride having the formula:

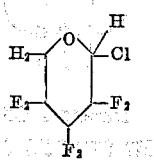

B.P. 111° C., $n^{20}$ 1.3535, $d\dfrac{20}{4}$ 1.64;

Analyses—Found: percent C, 26.53, 26.26, aver. 26.39; percent H, 1.41, 1.22, aver. 1.32; percent Cl, 15.45, 15.39 aver. 15.42; percent F, 49.1, 50.3, aver. 49.7 percent, Calc. for $C_5H_3ClF_6O$: percent C, 26.3; percent H, 1.31; percent Cl, 15.5; percent F, 49.9.

Partial chlorination of this material gave the same product that results from partial chlorination of 3,3,4,4,5,5-hexafluorotetrahydropyran, as indicated by boiling points and comparison of infrared spectra, thus confirming the ring structure. All of the data presented are consistent with the hydroxypyran structure given above for the material of B.P. 154–155.5° C. and M.P. 49–51° C.

In a similar manner tetrafluorosuccinyl chloride and hydrogen gas are reacted to yield 2-hydroxy-3,3,4,4-tetrafluoroetetrahydrofuran.

EXAMPLE 2

Hexafluoroglutaryl chloride (627 g., 2.26 moles) and hydrogen gas were reacted together in the system of Example 1 containing the catalyst remaining after running of Example 1. The procedure of Example 1 was followed except that prior purging with hydrogen was not effected since the system had just been used. Reactant flow rates were: acid chloride—about 0.19 moles per hour, and hydrogen gas—about 4.1 moles per hour. The product collected weighed 508 grams, of which 45–50% was substantially the hydroxypyran of Example 1, having a boiling point of 151–156° C. at atmospheric pressure and, after redistillation, having a melting point of 49–51° C.

Hydrogen gas and 2,2,3,3-tetrafluoroglutaryl chloride are reacted together in a similar manner to give a comparable yield of 2-hydroxy-3,3,4,4-tetrafluorotetrahydropyran.

EXAMPLE 3

Hexafluoroglutaryl chloride (951 g., 3.43 moles, flow rate, about 0.19 moles per hour) and hydrogen gas (flow rate about 4.1 moles per hour) were reacted together during a period of about 18 hours in the manner of Example 1 with a 1% palladium on carbon catalyst that had been used to reduce

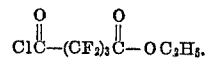

There were obtained 676.5 g. of product, for a theoretical material recovery, on a weight basis, of 93%, of which about 45% was the hydroxypyran of Example 1, as determined by distillation.

In a similar manner 2,2-difluorosuccinyl chloride reacts with hydrogen gas to yield 2-hydroxy-3,3-difluorotetrahydrofuran.

EXAMPLE 4

Hexafluoroglutaryl chloride (1024.5 g., 3.7 moles, flow rate, about 0.21 moles per hour) and hydrogen (flow rate, about 4.1 moles per hour) were reacted over the catalyst left from Example 3 in the manner of Example 3 to give about 806 g. of product, of which about 20% was the 2-hydroxypyran of Example 1. The remainder contained the compound $CHO(CF_2)_3CHO$.

EXAMPLE 5

The system of Example 1 was modified by removing the original receiver and substituting another, so designed that the product being collected could be dropped at will into a stirred solution of sodium carbonate in water (one mole of carbonate per 500 ml. $H_2O$), and thus hydrogen chloride removal could be effected rapidly.

Hexafluoroglutaryl chloride (230 g., 0.83 mole, flow rate about 0.18 moles per hour) and hydrogen (flow rate about 4.1 moles per mole) were reacted over fresh 1% palladium on carbon in the system as just described in in the manner of Example 1 with the following modifications. The product as collected was allowed to drop into the stirred aqueous carbonate solution. After reaction was complete enough water was added to the carbonate solution to dissolve the precipitated salts and yield a one-phase system, which was then extracted with five 75 ml. portions of diethyl ether. The ether extracts were combined and reserved as the "basic extract." The remaining aqueous phase was then strongly acidified by the addition of hydrochloric acid and this solution was then extracted with five 75 ml. portions of diethyl ether, which were combined and saved as the "acidic extract."

The "basic extract" was distilled and the fractions obtained were refractionated successively; this led to the recovery of a total of 102 g. of distillate, of which 76–77 g. were substantially the hemiacetal of Example 1. It had a boiling range of 149–160° C. (most boiled at 153–157° C.) and solidified on cooling to room temperature.

In a similar manner, tetrafluorosuccinyl chloride, 2,2-difluorosuccinyl chloride, 2,3-difluorosuccinyl chloride, 2,2-difluoroglutaryl chloride, 3,3-difluoroglutaryl chloride, 2,3,4-trifluoroglutaryl chloride, 2,2,3,4-tetrafluoroglutaryl chloride and 2,3,3,4-tetrafluoroglutaryl chloride are reacted with hydrogen to yield hydrogen chloride and the following respective products: 2-hydroxy-3,3,4,4-tetrafluorotetrahydrofuran, 2-hydroxy-3,3-difluorotetrahydrofuran, 2-hydroxy-3,4-difluorotetrahydrofuran, 2-hydroxy-3,3-difluorotetrahydropyran, 2-hydroxy-4,4-difluorotetrahydropyran, 2-hydroxy-3,4,5-trifluorotetrahydropyran, 2-hydroxy-3,3,4,5-tetrafluorotetrahydropyran and 2-hydroxy-3,4,4,5-tetrafluorotetrahydropyran.

EXAMPLE 6

The apparatus used comprised essentially a distillation apparatus connected to a heated receiver serving as a vaporizer, which in turn bore a thermometer, was connected to a metered source of hydrogen and led to the top of an electrically heated, tubular glass reactor containing 1% palladium on granular carbon. The bottom of this reactor was connected to a receiver leading to a Dry Ice trap.

$(CHO(CF_2)_3CHO)_n$, 53 parts, was placed in the still-pot of the distillation apparatus and heated to temperatures in the range 170–205 degrees centigrade depolymerize it. $CHO(CF_2)CHO$, refluxing at 103–104.5 degrees centigrade was allowed to drop into the heated receiver. The aldehyde vapors together with hydrogen (flow rate about 3 moles per hour) passed into heated reactor maintained at a temperature in the range 150–170 degrees centigrade. The reaction was carried out during a period of about 1 hour and 40 minutes; hydrogen alone was then passed through the hot reactor for an additional hour and then until the reactor cooled. Product weighing about 25 parts was collected which had an infrared spectrum showing it to be substantially the hydroxypyran of Example 1.

EXAMPLE 7

Hexafluoroglutaryl chloride (437 g., 1.58 moles, flow rate about 0.38 moles per hour) and hydrogen (flow rate about 4.1 moles per hour) were reacted over the catalyst remaining from Example 5 in the manner of Example 5 except that six 75 ml. ether portions were used in extractions and after the ether was removed by distillation from the "basic extract" to a pot temperature of 80° C. benzene (about 250 ml.) was added and water was then removed as the benzene azeotrope; following this the benzene was distilled off and the residues were fractionated. The hydroxypyran of Example 1 was obtained in about 64% yield on a total material recovery of 85–90%. $HOCH_2(CF_2)_3COOH$ or its lactone was also obtained in about 6% yield upon rectification of the "acidic extracts."

EXAMPLE 8

Hexafluoroglutaryl chloride (15 g., 0.157 moles, 0.19 moles per hour) and hydrogen (4.1 moles per hour) were reacted as in Example 1 over 5% palladium on carbon. The temperature of the reactor varied from about 260° C. at a point about 2 inches from the top of the catalyst bed to about 50° C. at the bottom of the reactor. About 95 g. of product was collected for a material recovery of about 79%. Infrared analyses of the product indicated that about 91% was the hydroxypyran of Example 1.

EXAMPLE 9

A composition containing 2-hydroxy-3,3,4,4,5,5-hexafluorotetrahydropyran of Example 1 was examined for herbicidal activity in preliminary greenhouse tests. Plots containing seedlings of rye, millet, and cucumber were sprayed at the rate of four pounds per acre when the seedlings were 2–3 weeks old. The spray comprised the above-described composition in water which in turn contained about 0.5 percent volume of a mixture of emulsifier, xylene and isophorone. The seedlings were examined about 2 weeks after application; the injury to the plants (or the amount of topkill) showed phytotoxicity and utility as a herbicide.

EXAMPLE 10

A polyvinyl chloride film was prepared from a mixture of polyvinyl chloride (50 parts) di-2-ethylhexylphthalate (22.5 parts) and barium cadmium laurate (1 part) by mixing it in a rubber mill at 300 degrees Fahrenheit for about three minutes and milling it in said mill for about five minutes. The film produced has a thickness of about 56 mils and served as the reference standard.

A second film was made in a similar manner except that 2-hydroxy - 3,3,4,4,5,5 - hexafluorotetrahydropyran (0.25 part) was added in addition to other materials, its thickness was about 54 mils.

The absorption of light of wave length about 4400 A. was then determined for a sample of each of the two films; the control had an absorbance of 0.324, whereas the sample containing the hydroxypyran had an absorbance of 0.218 thus demonstrating that it had better optical clarity than the film prepared without it.

In a similar manner, 2-hydroxy-3,3,4,4-tetrafluorotetrahydrofuran is added to a polyvinyl chloride film and the clarity is compared to the clarity of a film prepared without it. The film containing 2-hydroxy-3,3,4,4-tetrafluorotetrahydrofuran is of a better optical clarity than the film without it.

When there have been described various embodiments of the invention, these are not to be understood as limiting the scope of the invention, as it is realized that changes therein are possible. It is intended that each element of the invention is to be understood as referring to all equivalent elements for accomplishing substantially the same results in substantially the same or equivalent manner in whatever form it may be utilized.

What is claimed is:

1. A compound of the formula

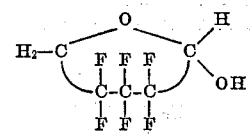

References Cited

UNITED STATES PATENTS 2,443,388   6/1948   Hawkins et al. _____ 260—345.9

NORMA S. MILESTONE, Primary Examiner

U.S. Cl. X.R.

260—92.8, 347.8, 544; 71—88

PO-1050
(5/69)

UNITED STATES PATENT OFFICE
CERTIFICATE OF CORRECTION

Patent No. 3,816,468          Dated   June 11, 1974

Inventor(s)   Samuel Gelfand, Russell L. K. Carr and Charles F. Baranauckas

It is certified that error appears in the above-identified patent and that said Letters Patent are hereby corrected as shown below:

Column 1, line 2, "Samuel Gelfan" should read --Samuel Gelfand--.

Signed and sealed this 8th day of October 1974.

(SEAL)
Attest:

McCOY M. GIBSON JR.                C. MARSHALL DANN
Attesting Officer                  Commissioner of Patents